US007399520B2

(12) United States Patent
Murk

(10) Patent No.: US 7,399,520 B2
(45) Date of Patent: Jul. 15, 2008

(54) FIBRE-REINFORCED BUILDING ARTICLE AND MANUFACTURING METHOD THEREOF

(75) Inventor: Erwin Coenraad Murk, Renswoude (NL)

(73) Assignee: Murk en Murk Holding B.V., Leerdam (NL)

( * ) Notice: Subject to any disclaimer, the term of this patent is extended or adjusted under 35 U.S.C. 154(b) by 251 days.

(21) Appl. No.: 10/802,581

(22) Filed: Mar. 17, 2004

(65) Prior Publication Data
US 2004/0191580 A1 Sep. 30, 2004

(30) Foreign Application Priority Data
Mar. 24, 2003 (EP) ................... 03075851

(51) Int. Cl.
B32B 27/12 (2006.01)
D04H 3/00 (2006.01)
(52) U.S. Cl. ................... 428/292.1; 428/297.4
(58) Field of Classification Search ................ 428/688, 428/34.4, 621, 411.1, 297.4, 292.1, 297.7, 428/421, 403, 422; 427/403, 422, 421; 521/102, 521/103
See application file for complete search history.

(56) References Cited
U.S. PATENT DOCUMENTS 4,740,527 A * 4/1988 von Bonin ................... 521/105
4,831,062 A * 5/1989 von Bonin ................... 521/103
4,992,481 A * 2/1991 von Bonin et al. ........... 521/54
5,214,200 A * 5/1993 Waller ........................ 560/240
6,458,423 B1 * 10/2002 Goodson ..................... 427/403

FOREIGN PATENT DOCUMENTS

EP  0 222 339 A1   5/1997
EP  1 001 000 A1   5/2000
EP   1001000 A1 *  5/2000

OTHER PUBLICATIONS

Database WPI Section Ch, Week 200114 Derwent Publications Ltd., London, GB; Class A14, AN 2001-123360 XP002251209 & AU 200 032 535 A (MBT Holding AG), November 9, 2000 *abstract*.
Glenium®—Master Builders Technologies, Product Information (ugc glen51 8/98).
Cem-FIL® AR Glass Fibre—Saint-Gobain Vetrotex, Product Information.

* cited by examiner

Primary Examiner—Bruce H. Hess
Assistant Examiner—Camie S Thompson
(74) Attorney, Agent, or Firm—Hoffman & Baron, LLP

(57) ABSTRACT

A fibre-reinforced building article includes a matrix of a binding material, and at least one fibrous layer of alkaliresistant glass fibres incorporated in the matrix. The binding material is based on an aluminous cement, a carboxylic ether polymer based plasticizer and alkaliresistant glass fibres. The fibre-reinforced building article has fire protection properties.

18 Claims, 1 Drawing Sheet

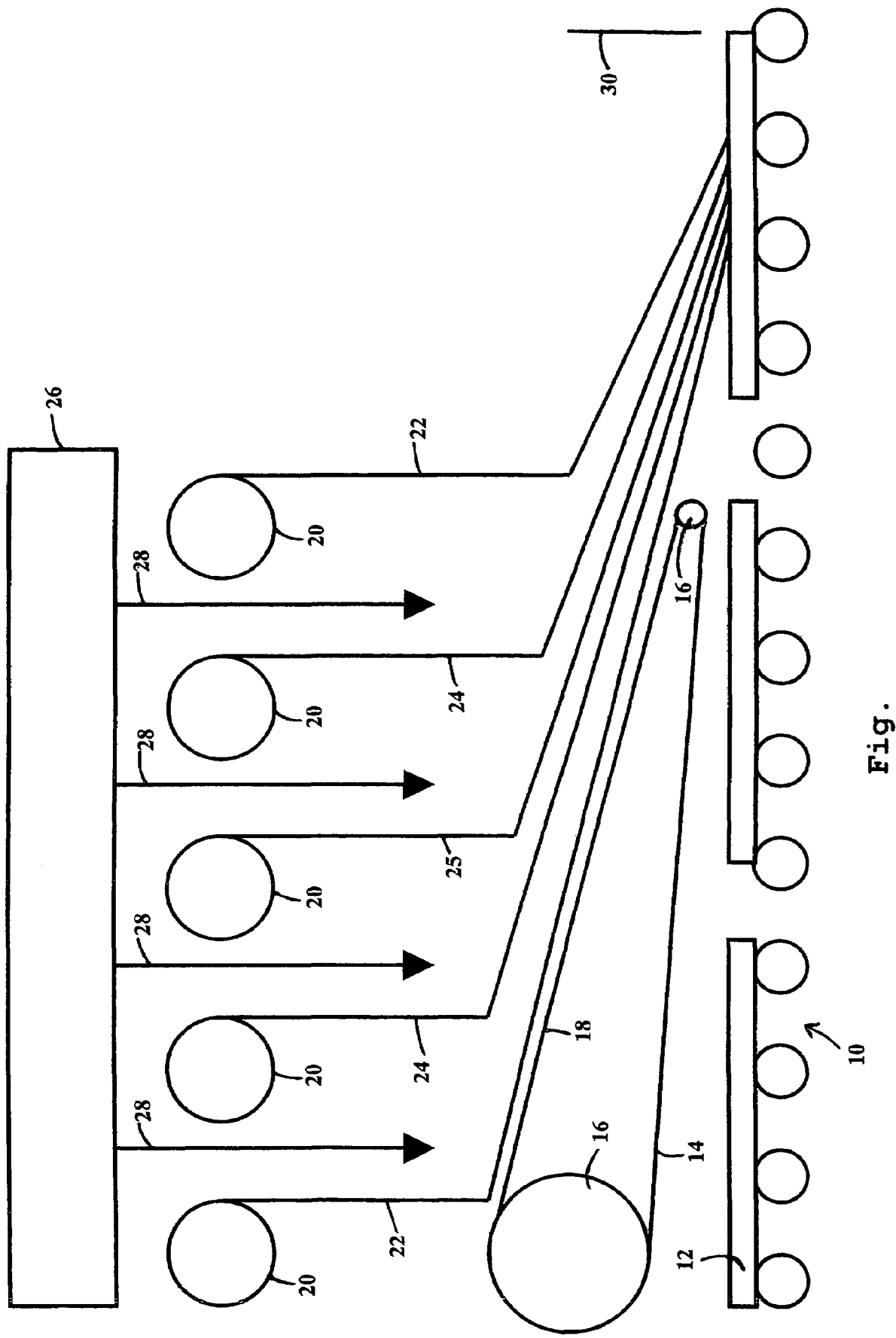

FIBRE-REINFORCED BUILDING ARTICLE AND MANUFACTURING METHOD THEREOF

CROSS-REFERENCE TO RELATED APPLICATIONS

This application claims the benefit of European Patent Application No. EP 03075851.0, filed Mar. 24, 2003, the contents of which is incorporated herein by reference

FIELD OF THE INVENTION

The present invention relates to a fibre-reinforced building article having fire-retarding properties, and a manufacturing method thereof. Fibre-reinforced building articles like panels, blocks and bricks having fire-retarding properties are useful as fire protection for buildings and other civil engineering constructions. Building articles of this kind are made from different starting materials, for example by casting.

BACKGROUND OF THE INVENTION

In the art of fire protection also so-called spray coatings are known, which can be directly applied to a building construction in order to provide an adequate fire protection. E.g. European patent application 1 001 000 discloses such a spray coating and application method thereof. This known method comprises the steps of preparing a slurry capable of originating a refractory material upon firing, and coating a layer of the unfired slurry onto the construction to be protected. The basic idea of this known method is that the thermal energy in case of a fire is used to build up an effective fire protection. In the specification it is said that the slurry as such can be obtained by adding water to a known mixture, which mixture is used in the manufacturing industry of refractory materials to shape panels and bricks, that are then fired to manufacture the desired refractory articles. This spray coating method and composition have proven their value in fire protection of civil engineering constructions, for example in submarine tunnels.

A preferred composition according to this patent application comprises kaolin, chalk, powdered isolating refractory brick, refractory filler, sawdust, aluminous cement and possibly portland cement. A cementiceous composition according to the above European patent application is available as FireBarrier 135 from Thermal Ceramics.

However, it would be very useful to use this composition in the preparation of casted building articles, such as flat panels, blocks and bricks, which exhibit the same fire protection properties as the spray coating. Unfortunately it has been shown that the processing time of the ready-to-use mixture for casting such articles is insufficient (in the order of 10 minutes), resulting in premature curing and inadequate quality of the articles thus casted.

SUMMARY OF THE INVENTION

Accordingly the object of the invention is to provide casted building articles, based on this known composition and having essentially the same fire protection properties, and a manufacturing method for these kind of articles.

Therefore the present invention provides in a first aspect a fibre-reinforced building article having fire protection properties, which article comprises a matrix of a binding material comprising an aluminous cement, a carboxylic ether polymer based plasticizer, a fugitive material, filler and alkaliresistant glass fibres, and at least one fiber layer of alkaliresistant glass fibers, incorporated in said matrix.

Surprisingly it has been found that a fibre-reinforced building article having the composition mentioned above can be prepared by casting if specific additives are incorporated, and that these articles possess the same fire protection properties as the spray coating.

In the search for a solution to the problem identified above a number of additives have been tried. Surprisingly it has been found that the combination of the cementiceous composition together with a carboxylic ether polymer based plasticizer and alkaliresistant glass fibers allows casting of such building articles. The presence of the plasticizer extends the processing time from this aluminous cement composition from 10 minutes to approximately 90 minutes, which is sufficient to allow manufacturing the building articles by casting. Furthermore the plasticizer improves the flow properties, in particular the viscosity of the aqueous mixture of aluminous cement, which is used to prepare the building articles. Compactation of the cement also occurs, which improves the strength. In addition the surface properties of the building articles are enhanced. The alkaliresistant glass fibres, both in the matrix and in the reinforcing layer(s), contribute to the strength and rigidity of the building article. The glass fibres should be alkaliresistant, otherwise they are attacked by the binder material.

In a preferred embodiment of the building article according to the invention the weight ratio of the plasticizer with respect to the aluminous cement is in the range of 3-5%. When thicker building articles are produced a weight ratio within the lower area of this preferred range can be used. However, flat panels having a thickness in the order of about 20 mm have a weight ratio within the upper area of this preferred range.

Preferably the plasticizer comprises a carboxylate ether polymer having relatively long side chains attached to the backbone of the polymer. One example thereof is Glenium 51, which is available from MBT (Degussa). This so-called superplasticizer is known for its excellent properties, in particular where low water cement ratios are required. These properties are derived from the lateral chains, linked to the polymer backbone, which after initial mixing provide a steric hindrance, which stabilizes the cement particles' capacity to separate and disperse.

Here it should also be noted that known casted fibre-reinforced building articles having fire protection properties loose their fire protection properties upon contact with moisture, for example water. Thus these known panels have the disadvantage that they cannot be cleaned by aqueous cleaning agents, for example steam cleaning. Another disadvantage thereof is that once these building articles have been exposed to a fire, which has been extinguished by water, the articles have to be removed and replaced by fresh ones.

Advantageously the filler comprises granular waste materials, for example by-products from the manufacturing of refractory bricks.

The fugitive material used in the invention is a material that is fugitive on exposure to fire, thereby creating escape passages for the gases generated by the firing of the matrix. Preferably the fugitive material comprises a particulate cellulose based material, more preferably sawdust. Sawdust is capable of absorbing a great amount of water, typically around 2.5 times its own weight. It is believed that during a fire this water evaporates and absorbs a great amount of heat. Then the sawdust starts burning, leaving free spaces (voids) that can serve as escape passages for the gases generated by the firing of the matrix. This ensures that the matrix is converted to a homogeneous refractory layer. Other materials, for example that melt or evaporate upon exposure to a fire, are also contemplated for use in the invention as fugitive material.

The amount of alkaliresistant glass fibres in the matrix of the binding material in the building article according to the invention is not particularly limited. These glass fibres, such as chopped fibres, have the function of protecting the surrounding matrix material from collapsing, and provide the building article with sufficient strength as do the reinforcing layers of alkaliresistant fibres. Preferably the reinforcing layers of alkaliresistant glass fibres are glass fibre mats or rovings. More preferably such a layer of glass fibres is incorporated between layers of the matrix material. As a general rule, one layer of glass fibres is present in each centimeter of matrix material as viewed in the thickness direction. Cem-FIL alkaliresistant glass fibres, available from Saint Gobain, are examples of suitable fibres to be used in the present invention.

Advantageously the shape of the building article according to the invention is adapted to the (shape of) structure to be protected, such as a flat or curved wall, column and the like. One preferred building article according to the invention has the shape of a flat panel. Other suitable shapes include building bricks and building blocks. A panel according to the invention, wherein the length and width of the panel are large compared to its thickness, comprises preferably at least two spaced apart co-planar fibre layers, wherein the distance between these fibre layers is larger than the distance of a fibrous layer to the surface of the building article. In another preferred embodiment at least one layer of alkaliresistant glass fibres comprises parallel glass rovings, in particular in the longitudinal direction. In yet another preferred embodiment of a panel according to the invention a fibrous layer comprising glass rovings is positioned in the center plane, and outer fibrous layer comprising fibre mats are positioned near the surface of the building article.

According to a further aspect the invention provides a method for manufacturing a fibre-reinforced building article having fire protection properties according to one of the preceding claims, comprising casting an aqueous mixture of binding material comprising an aluminous cement, a fugitive material, filler, alkaliresistant fibres and a carboxylic ether polymer based plasticizer, into a mould, positioning additional alkaliresistant glass fibres in at least one layer in the mould during casting, in order to obtain a preform and allowing the thus obtained preform to dry.

In manufacturing of a building article according to the invention the curing rate and viscosity are preferably controlled by the amount of water and plasticizer.

In order to manufacture panels having a relatively small thickness the mould has the shape of a rectangular with a small depth. As already discussed above, preferably the glass fibre layers (e.g. mats) are positioned near the upper surface and the bottom surface of such a panel, while one or more intermediate layers may (rovings) be present, for example in the middle of the panel.

In a preferred embodiment of the method according to the invention the method is carried out in a semi-continuous fashion. Advantageously the method comprises the steps of feeding a mould, positioning a water impermeable foil in the mould, casting a first surface layer of binding material in the mould, positioning a fibre layer of glass fibres in the mould, casting at least one further layer of binding material in the mould, and positioning a water impermeable foil over the layer of binding material last casted. The water impermeable foil prevents the building article casted from being dried too fast.

Preferably the moulds are temporarily positioned on a conveyor belt.

BRIEF DESCRIPTION OF THE DRAWINGS

FIGURE is a schematic illustration of a device for producing a fibre-reinforced building article according to the present invention.

DETAIL DESCRIPTION

The invention will be explained in more detail in the following example and description of the attached FIGURE, wherein a semi-continuous method according to the invention is shown.

EXAMPLE

A batch of binding material was prepared by mixing 1000 kg Fire Barrier 135 with 22 litre Glenium 51 (35%) and 418 litre make up water. The batch thus prepared could be processed during approximately 90 minutes, while maintaining its favourable flow characteristics. From this batch a panel was manufactured having a thickness of 28 mm. Three glass fibre layers (alkaliresistant Cem-FIL) were present in the panel. The bottom and upper layer of glass fibre mats (mesh size 10×10 mm) were positioned at a distance of approximately 5 mm from the respective surfaces, while a further layer of glass rovings (spaced parallel at a distance of 20 mm from each other) was positioned in the center plane.

The panel thus manufactured was subjected to a fire test according to RWS standards. At one side of the panel the temperature was raised to approximately 1350° C. as a result of a fire. This temperature was maintained for about 2 hours. During this test the opposite side of the panel attained a temperature of 104° C. This test was repeated three times with the same panel without failure thereof.

It was tried to manufacture the same sort of panels using other types of plasticizers among which are BETOMIX, POZZOLITH, RHEOBUILD 1000- and 2000 series. However the workability of these batches was insufficient to prepare panels according to the invention.

In the FIG. a device for carrying the method according to the invention is shown. This device comprises a conveyor 10, for example a roller conveyor, for conveying moulds 12 one behind the other. Above this mould conveyor an endless belt 14 is arranged, on which the actual casting process takes place. The belt 14 is driven by one of the rolls 16. The upper part 18 of the belt 14 slightly slopes downwards in the direction of movement. For clarity purposes the sloping angle is exaggerated in this drawing. Above this belt 14 five stock rolls 20 are positioned. The first and last stock roll provide a web of a fluid impermeable foil 22, while each adjacent stock roll provides a web of glass fibre mat 24. The center stock roll provides the roving layer 25. In-between the several stock rolls 20 the casting of the binding material takes place, in this case from a storage vessel 26 via casting lines 28. The operation of this device is as follows. A foil web 22 is unwound from the first stock roll 20 onto the endless belt 14. Binding material is casted onto this foil 22 until a certain predetermined thickness is obtained. Subsequently a bottom glass fibre mat 24 is provided by the second stock roll 20. Then an intermediate layer of binding material is casted onto the glass fibre web 24. This intermediate layer of binding material is covered with a glass fibre layer 25 comprising spaced apart parallel glass rovings, which is derived from the center stock roll 20. Then a further layer of binding material is casted, followed by the application of a further glass mat layer, and casting an outer layer of binding material. Finally a top layer of impermeable foil 22 is positioned upon the top layer of binding material. Beneath the belt 14 the moulds 12 are transferred from a storage position to a filling position. In this filling position the continuous casted product is laid down in a mould 12 and the several layers are cut by a suitable cutting device 30. Then the moulds 12 are transferred to drying section (not shown), where the binding material is allowed to dry at a maximum temperature of 30° C. to form panels according to the invention. After the panels have been dried in this way, the water impermeable foils 22 are removed. A production rate of 8 m/min has been realized.

While there have been described what are presently believed to be the preferred embodiments of the invention, those skilled in the art will realize that changes and modifications may be made thereto without departing from the spirit of the invention, and it is intended to include all such changes and modifications as fall within the true scope of the invention.

What is claimed is:

1. A fibre-reinforced building article having fire protection properties, consisting essentially of a matrix of a binding material consisting essentially of an aluminous cement, a carboxylic ether polymer based plasticizer, a fugitive material, filler, and alkaliresistant glass fibers, and at least one fiber layer of alkaliresistant glass fibers, incorporated in said matrix.

2. The building article according to claim 1, wherein the weight ratio of he plasticizer with respect to the aluminous cement is in the range of 3-5%.

3. The building article according to claim 1, wherein the filler comprises granular waste materials.

4. The building article according to claim 1, wherein the plasticizer comprises a carboxylate ether polymer having long side chains attached to the backbone of the polymer.

5. The building article according to claim 1, wherein the fugitive material comprises sawdust.

6. The building article according to claim 1, comprising at least two spaced apart co-planar fiber layers, wherein the distance between these fiber layers is larger than the distance of a fibrous layer to the surface of the building article.

7. The building article according to claim 6, wherein the building article has the shape of a flat panel.

8. The building article according to claim 1, wherein at least one layer of alkaliresistant glass fibers comprises parallel glass rovings.

9. The building article according to claim 1, wherein the building artlcle has the shape of a building brick or building block.

10. A method for manufacturing a fibre-reinforced building article having fire protection properties, comprising
casting an aqueous mixture of binding material consisting essentially of an aluminous cement, a fugitive material, filler, alkaliresistant fibers and a carboxylic ether polymer based plasticizer, into a mould, and
positioning additional alkaliresistant glass fibers in at least one fiber layer in the mould during casting, in order to obtain a preform and allowing the thus obtained preform to dry.

11. The method according to claim 10, wherein the weight ratio of the plasticizer with respect to the aluminous cement is in the range of 3-5%.

12. The method according to claim 10, wherein the plasticizer comprises a carboxylate ether polymer having relatively long side chains attached to the backbone of the polymer.

13. The method according to claim 10, wherein the filler comprise granular waste material.

14. The method according to claim 10, wherein the fugitive material comprises sawdust.

15. The method according to claim 10, wherein the mould has the shape of a rectangular box having a small depth.

16. The method according to claim 10, comprising the steps of feeding a mould, positioning a water impermeable foil in the mould, casting a first outer layer of binding material in the mould, positioning at least one layer of glass fibers in the mould, casting at least one further layer of binding material in the mould, and positioning a water impermeable foil over the layer of binding material last casted.

17. A fibre-reinforced building article having fire protection properties, comprising:
at least two spaced apart co-planar fiber layers of aikaliresistant glass fibers; and
a matrix of a binding material comprising an aluminous cement, a carboxylic ether polymer based plasticizer, a fugitive material, filler, and alkaliresistant glass fibers, wherein
the at least two fiber layers of alkaliresistant glass fibers are incorporated in said matrix.

18. The building article of claim 17, wherein the matrix of the binding material consists essentially of an aluminous cement, a carboxylic ether polymer based plasticizer, a fugitive material, filler, and alkaliresistant glass fibers.

\* \* \* \* \*